United States Patent
Bowie

(10) Patent No.: US 7,866,347 B2
(45) Date of Patent: Jan. 11, 2011

(54) ISOLATION TOOL

(75) Inventor: Angus George Bowie, Rothienorman (GB)

(73) Assignee: Stats (UK) Limited (GB)

( * ) Notice: Subject to any disclaimer, the term of this patent is extended or adjusted under 35 U.S.C. 154(b) by 539 days.

(21) Appl. No.: 11/779,976

(22) Filed: Jul. 19, 2007

(65) Prior Publication Data

US 2008/0017390 A1  Jan. 24, 2008

(30) Foreign Application Priority Data

Jul. 19, 2006 (GB) ................... 0614312.7

(51) Int. Cl.
*F16L 55/10* (2006.01)
(52) U.S. Cl. .............. 138/94; 138/93; 138/89
(58) Field of Classification Search ........... 138/94, 138/93, 89
See application file for complete search history.

(56) References Cited

U.S. PATENT DOCUMENTS

| | | | | |
|---|---|---|---|---|
| 411,978 A | * | 10/1889 | Chisholm | 138/94 |
| 1,177,338 A | * | 3/1916 | Kayfetz | 138/94 |
| 1,747,933 A | * | 2/1930 | Goodman et al. | 138/94 |
| 4,144,908 A | * | 3/1979 | Dunn | 138/93 |
| 4,422,477 A | | 12/1983 | Wittman et al. | 138/89 |
| 4,484,602 A | * | 11/1984 | Guthrie | 138/93 |
| 5,462,077 A | * | 10/1995 | Cohen et al. | 137/15.08 |
| 5,690,139 A | * | 11/1997 | Murphy et al. | 137/317 |
| 2004/0003855 A1 | | 1/2004 | Dees et al. | |

FOREIGN PATENT DOCUMENTS

| | | |
|---|---|---|
| DE | 19514865 C1 | 9/1996 |
| DE | 19638778 A1 | 3/1998 |
| JP | 10082496 | 3/1998 |
| WO | 0047928 | 8/2000 |
| WO | 2007041856 A1 | 4/2007 |
| WO | 2007073197 A1 | 6/2007 |

OTHER PUBLICATIONS

Search Report under Section 17 for Application No. GB0714113.8 dated Oct. 18, 2007.

* cited by examiner

*Primary Examiner*—Patrick F Brinson
(74) *Attorney, Agent, or Firm*—Carlson, Gaskey & Olds PC

(57) ABSTRACT

An isolation tool for use in a pipe comprises a seal unit, the seal unit being mounted to a launching assembly. The seal unit is adapted for location in a section of pipe, the seal unit adapted to be inserted into the pipe via a single opening in the pipe wall. The seal unit comprises seal elements for engaging the pipe wall to isolate a section of pipe. The seal elements are initially retained in a retracted configuration. Hydraulic pressure is applied to a cylinder, a piston located in the cylinder being translated into the seal unit, causing compression of the seal elements.

52 Claims, 3 Drawing Sheets

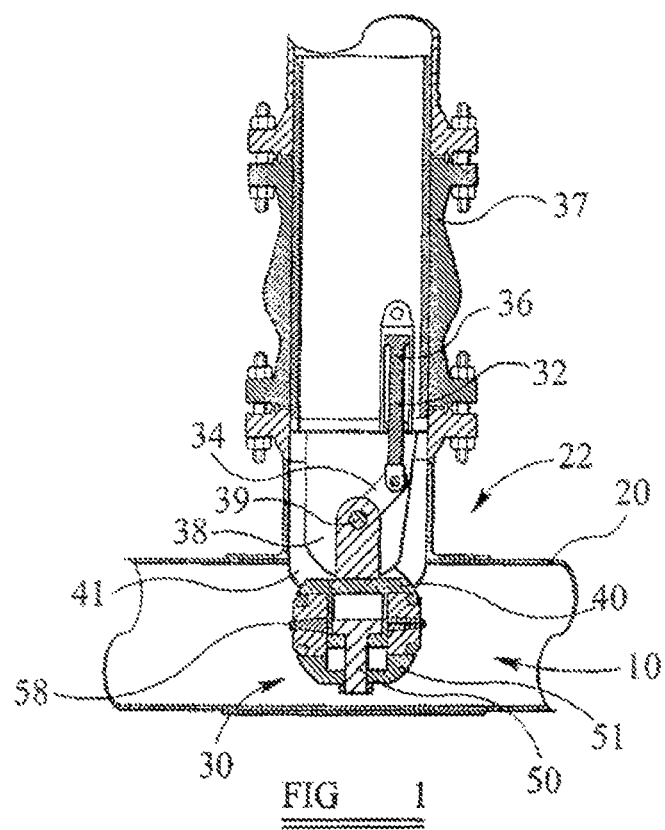
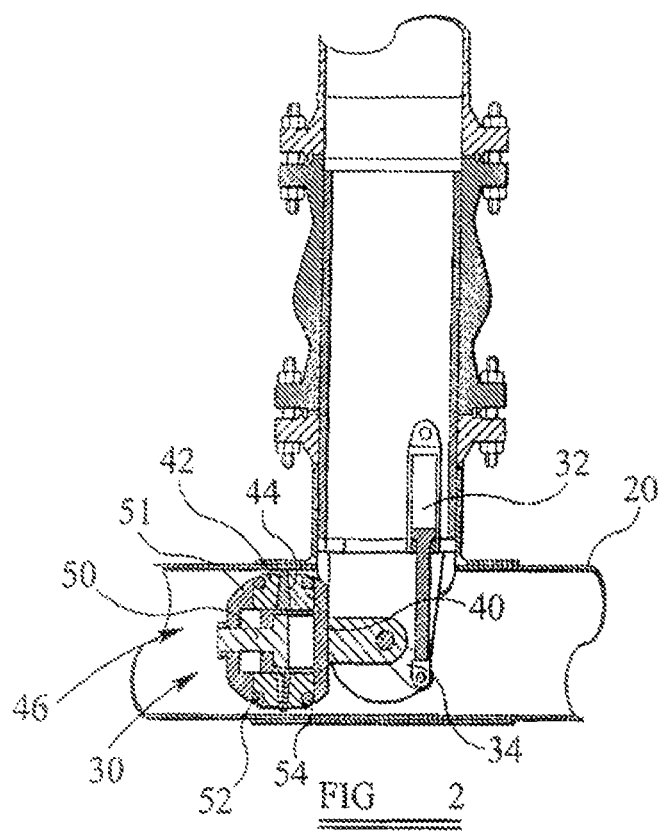

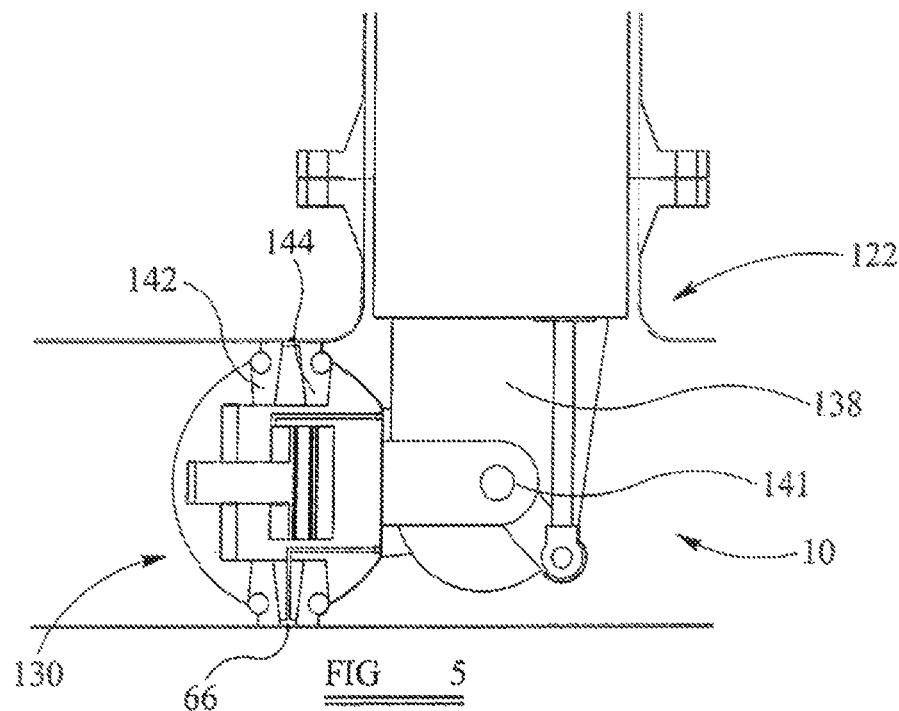
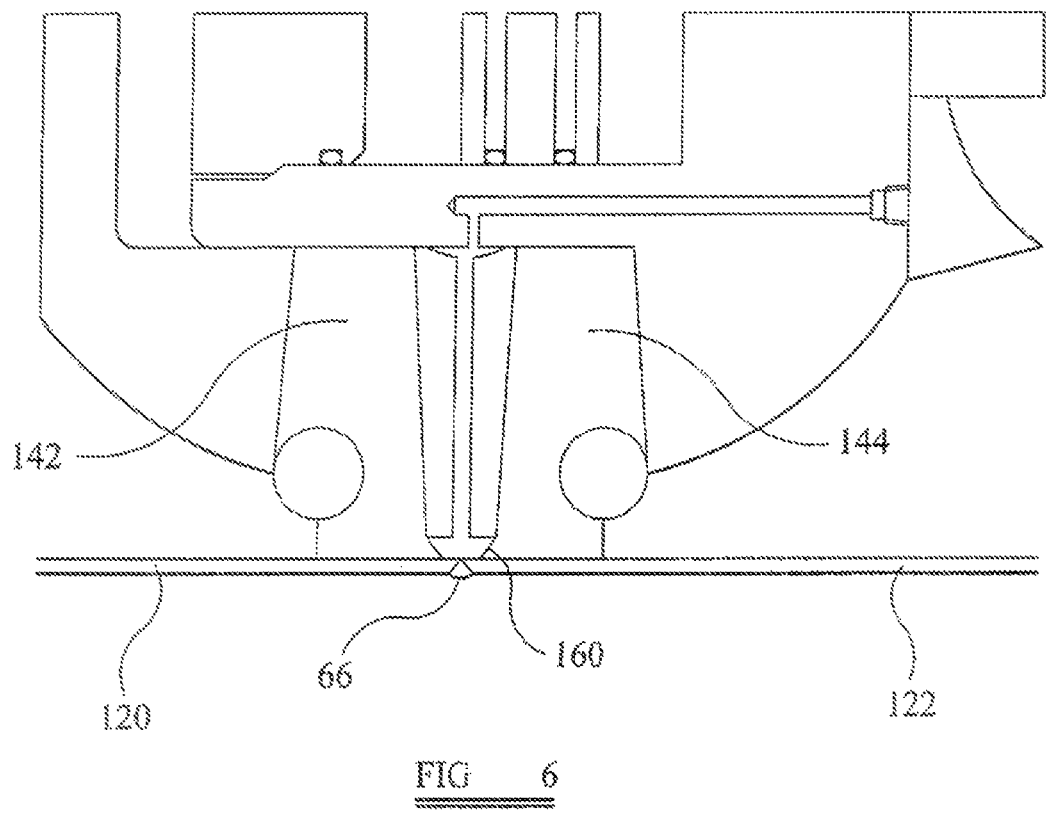

ISOLATION TOOL

CROSS REFERENCE TO RELATED APPLICATIONS

This application claims priority to United Kingdom Patent Application No. GB 0614312.7 which was filed on 19 Jul. 2006.

FIELD OF THE INVENTION

The present invention relates to an isolation tool for use in a pipe. Embodiments of the invention relate to a double block isolation tool for use in isolating a section of a pipe transporting fluids such as oil, gas or the like.

BACKGROUND TO THE INVENTION

The oil and gas industry has for many years used hot tapping and stoppling techniques in order to provide localised isolation of a "live" section of pipe.

Hot tapping involves the fitting of a branch or tee connection to a live pipeline containing fluid at pressure. The connection may be welded or mechanically secured to the pipe, a valve being subsequently fitted to the connection. A tapping or drilling tool is then connected to the valve, the tapping tool being activated to pass through the open valve and drill through the pipe wall to create the branch. The tapping tool is configured to prevent leakage of fluid from the pipe. On completion of the drilling process, the tapping tool may be removed and the valve closed to complete the branch connection. Thus, fluid may be selectively directed via the branch connection. Alternatively, or in addition, tools may be inserted and/or removed via the hot tap connection to perform a variety of tasks within the pipe.

Where pipe isolation is required, a plug or stopple including a lip seal is inserted through the tap connection to provide uni-directional sealing isolation of the pipe inboard of the stopple. In order to apply a test pressure to test the integrity of the stopple seal a second opening is cut into the pipe at a location outboard from the first opening and a second plug or stopple put in place. A smaller third opening is drilled between the first and second openings to pressurize the isolated area between the first and second stopples, and thus pressure test the first or primary stopple seal, and also the second seal. This may only be achieved if the uni-directional lip seal arrangement of the second stopple is arranged against the prevailing pressure, that is in the opposite orientation to the first or primary seal. Thus, although two pressure-tested seals have been provided, only one, the primary seal, is effective against the isolated pressure.

In addition, each intervention into the pipe requires additional planning, setup and operation time resulting in increased costs for the operator.

SUMMARY OF THE INVENTION

According to a first aspect of the present invention there is provided an isolation tool for use in isolating a section of a pipe, the isolation tool comprising:

a seal unit adapted to be located in a section of pipe, the seal unit adapted to be inserted into the pipe via a single opening in the pipe wall and comprising at least two seal elements adapted to engage the pipe wall to isolate a section of pipe.

Embodiments of the present invention thus provide a double block isolation tool providing a dual seal unit for use in isolating a section of pipe via a single intervention into the pipe. Beneficially, the use of a single bore entry of the type described reduces the operation time and cost involved in isolating the required section of pipe.

It will be understood that reference to the term pipe includes any tubular construction including an oil or gas pipeline, whether subsea, above or below ground, downhole tubing, or indeed any other tubular suitable for transport or storage of fluids.

The isolation tool may be adapted to be inserted into the pipe through a hot tap or the like, or through an established or existing branch, tee or opening.

At least one of the seal elements may be capable of sealing the section of pipe. In particular, in preferred embodiments of the invention either of the seals may be capable of resisting the full differential pressure between the pressurised portion of the pipe and the isolated portion of the pipe.

At least one of the seal elements may be a bi-directional seal. Accordingly, either or both of the seal elements may provide full sealing capability.

At least one of the seal elements comprises an elastomeric seal.

At least one of the seal elements may comprise a compression seal, that is a seal that is set or energised by compressing the seal. Most preferably, both seal elements comprise compression seals.

The seal elements may be adapted to be compliant to the pipe surface. Thus, seal integrity may be maintained where the inner surface of the pipe is irregular or has been subject to damage.

The seal elements may be adapted to be self-energising on the seal unit experiencing a predetermined differential pressure.

The seal elements may be actuated at least in part mechanically, hydraulically or by any other suitable means. The actuation force may be externally applied. Alternatively, or in addition, a differential pressure across the seal unit may actuate the seal elements. In a preferred embodiment, a predominant proportion of the load generated on the seal unit by the pipe or differential pressure is transmitted through the seal unit to the seal elements, which may be annular. Thus, as the cross-sectional area of the annular seal elements is less than the pipe cross-sectional area and of the seal unit, the pressure transmitted through the seal elements is greater than the pipe pressure, thus preventing bypass of fluid around the seal and assisting in prevention of explosive decompression of the seal.

The seal elements may be adapted to be initially compressed to provide at least initial isolation of the pipe. This is advantageous in particular where the tool is used in lower pressure applications.

At least one anti-extrusion spring may be provided for each seal element. Thus, the seal member is prevented from extruding when exposed to high differential pressures or high compressive loads.

The seal unit may be adapted to be introduced into a pipe via a branch, which will typically be perpendicular to the pipe axis. The seal unit may be adapted to pass through the branch in alignment with the branch axis and then be rotated for alignment with the pipe axis. The seal unit may be adapted to be rotated through approximately 90 degrees. Seal unit rotation may be actuated at least in part hydraulically, mechanically, by a combination of hydraulic and mechanical actuation or by any other suitable means.

The seal unit may comprise a location linkage, which may comprise a clevis. The location linkage may include a support member, which may comprise a padeye. The location linkage may be configured to locate the seal unit spaced from the branch, for example a dimension of a location linkage clevis, such as the length of the clevis, may be selected to control the axial positioning of the seal unit within the pipe.

Where the seal unit is rotatable, the linkage between the seal unit and a support member may be adapted to support loads applied by the seal unit to the support member by abutting faces in addition to any loads transferred between the seal unit and the support member via a pivot pin or hinge.

The seal unit may comprise a seal actuator including a fluid piston, the piston being adapted to translate to provide compression of the seal elements. In a preferred embodiment, axial compression of the seal elements deforms the elements radially outwards into contact with the circumferential wall of the pipe to provide a seal therebetween. Alternatively or in addition, the seal actuator may be adapted to translate by application of a pressure differential across the actuator. The pressure differential may be induced by applying or providing an elevated pressure outboard of the seal unit in the pipe. Alternatively, or in addition, the differential pressure may be induced by venting fluid to create a lower pressure region inboard of the seal unit.

The seal unit may comprise an annular ring located around a central portion of the seal unit and between the seal elements.

In use, the seal unit may be adapted to define an annular volume or chamber between the seal elements, the annular ring and the pipe. The annular ring may comprise a fluid conduit adapted for communication with the volume. The fluid conduit may comprise a bleed port adapted to permit fluid to be bled from the annular volume. The seal integrity may be pressure tested by monitoring the pressure in the annular chamber.

The tool may be adapted for isolating a pipe in high pressure applications, for example isolating a pipe section against up to approximately 200 bar differential pressure. Alternatively, the tool may be utilised in low pressure applications.

The tool may be adapted to be removable from the pipe, typically through the opening through which the tool was introduced into the pipe. In a preferred embodiment of the present invention, the seal elements may be deactivated by deactivating a seal actuator, for example by bleeding off fluid from an actuating piston.

Alternatively, or in addition, the seal elements may be adapted to be deactivated by application of pressure on the actuator, for example by application of pressure on the inboard side of the fluid piston. On equalization of pressure across the seal unit, the tool may be removed from the pipe.

The tool may be adapted to be removed from the pipe via a hot tap connection.

According to a second aspect of the present invention, there is provided a method of isolating a section of a pipe, the method comprising the steps:

inserting a seal unit into the pipe through an opening in the wall of the pipe, the seal unit comprising at least two seal elements; and actuating the seal elements to isolate a section of the pipe.

Actuating the seal elements may include radially extending the elements from a retracted configuration.

The method may further comprise the step of applying an elevated pressure to a volume between the seal elements to test the pressure integrity of both seal elements.

The method may further comprise the step of rotating the seal unit after insertion into the pipe to align the seal elements with the pipe axis.

The method may further comprise the step of forming an opening in a wall of a pipe, which may be achieved by hot tapping.

BRIEF DESCRIPTION OF THE DRAWINGS

These and other aspects of the present invention will now be described, by way of example only, with reference to the accompanying drawings, in which:

FIG. 1 is a cross sectional view of an isolation tool located within a hop tapped section of pipe in accordance with a preferred embodiment of the present invention;

FIG. 2 is a cross sectional view of the isolation tool of FIG. 1, shown rotated through 90 degrees;

FIG. 5 is a cross sectional view of an isolation tool in accordance with another embodiment of the present invention; and FIG. 6 is an enlarged cross sectional view of the tool of FIG. 5.

DETAILED DESCRIPTION OF THE DRAWINGS

In reference initially to FIGS. 1 and 2 of the drawings there is shown an isolation tool 10 in accordance with a preferred embodiment of the present invention, the tool 10 shown located within a section of pipe 20. It is intended that the tool 10 will be sold by the Applicant under the name Branch Installed Self-Energised Plug or BISEP.

Figure 3:
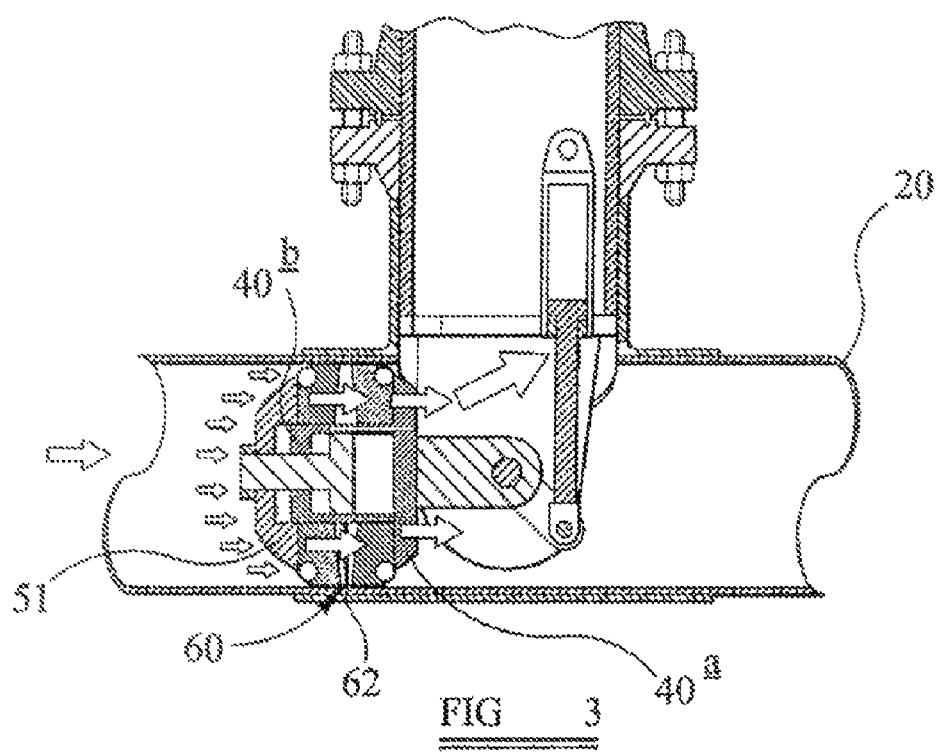
FIG. 3 is a cross sectional view of the isolation tool of FIGS. 1 and 2 shown in deployed configuration, with arrows representing the self-energistation load path through the tool.
Figure 4:
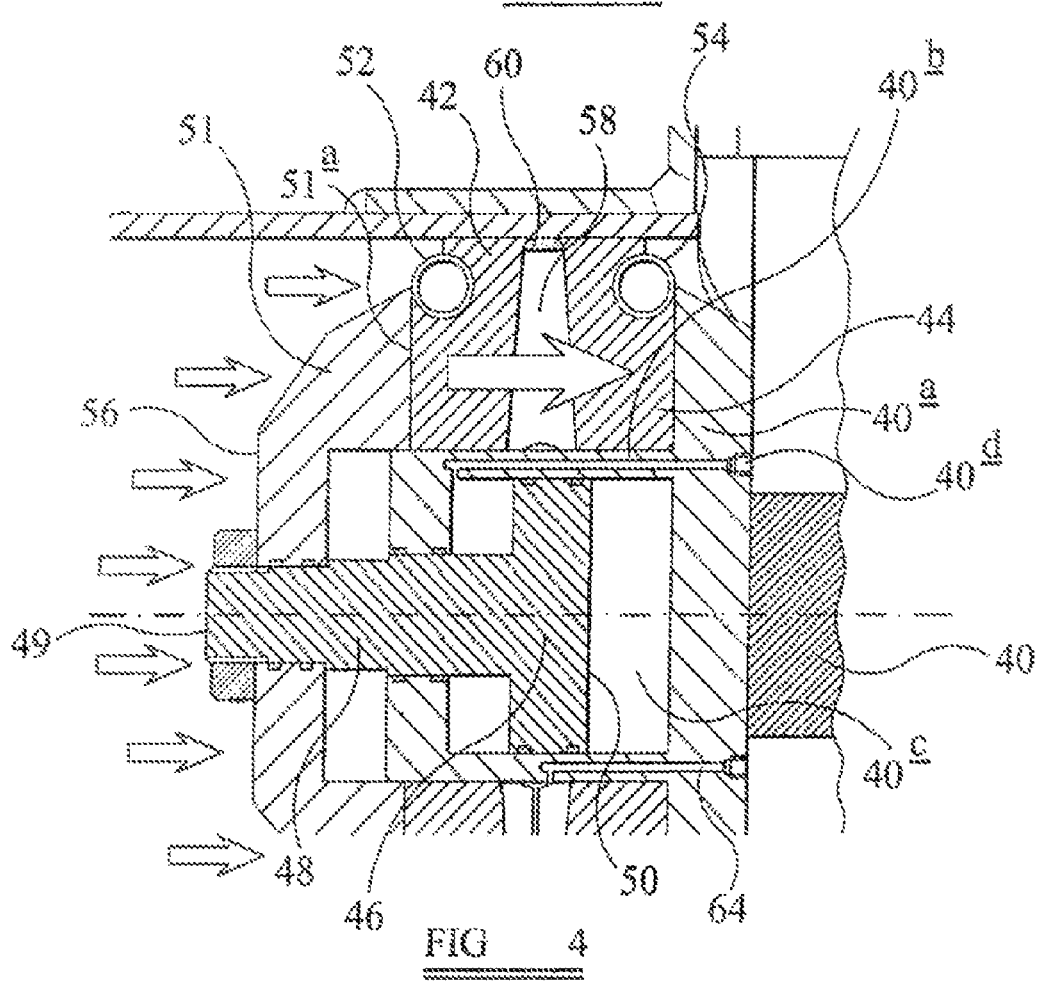
FIG. 4 is an enlarged view of the isolation tool of FIG. 3.

A tee or branch connection 22 has been created in the pipe 20 by hot tapping, and the tool 10 inserted via the hot tap connection 22. The tool 10 comprises a seal unit in the form of a spherical globe seal module 30. The seal module 30 is mounted to a launching stem bar assembly 37 via a clevis 38, pivot pin 39 and padeye 41. The clevis 38 is shaped to conform to the form of the base of the padeye 41 where the padeye 41 joins the assembly 37 so as to provide maximum surface contact when the seal module 30 is oriented towards the outboard end of the pipe 20, as illustrated in FIGS. 2 to 4. Furthermore, the seal module 30 is coupled to the launching assembly 37 by a hydraulic ram 32 via a crank arrangement 34, actuating the ram 32 causing the module 30 to rotate between an initial insertion orientation, parallel to the branch axis (FIG. 1), and a sealing orientation, parallel to the pipe axis (FIG. 2).

The seal module 30 comprises a first body portion 40 defining a seal support disc 40a and a central seal support core 40b, and two annular elastomeric compression seal elements 42, 44 mounted on the body portion 40.

The seal support core 40b defines a cylinder 40c which accommodates a seal actuating piston 46. An outboard portion of the cylinder 40c is in communication with a fluid supply passage 40d, while an inboard portion of the cylinder 40c is at atmospheric pressure. The inboard portion of the cylinder 40c is also in communication with a fluid supply to permit application of pressure to assist in release of the tool 10. A piston rod or actuator 48 extends from the piston 46 and has a leading end 49 coupled to a second body portion 51 which defines the leading face of the seal module 30, and also defines an annular seal energising face 51a. The seal elements 42, 44 are located between the seal energising face 51a and the seal support disc 40a.

The seal elements 42, 44 each comprise anti-extrusion springs 52, 54 which lie within the outer diameters of the seal support disc 40a and the seal energising face 51a.

The seal module 30 further comprises an annular ring 58 disposed on the seal support core 40b between the elastomeric seal elements 42, 44. The ring 58, seal elements 42, 44 and inner face of the pipe 20 collectively define an annular volume or chamber 60. When the seal elements 42, 44 are energised (FIGS. 3 and 4), a fluid supply passage 62 within the annular ring 58 is in communication with a fluid conduit 64 in the first body portion 40.

In use, a hot tap is performed by any appropriate method. In the illustrated embodiment, a saddle has been welded to the pipe, and a short length of flanged pipe welded to the saddle. A valve has been bolted to the pipe and the pipe tapped to form a branch or tee. The tool 10 has then been run into the pipe through the open valve with the seal elements 42, 44 in a retracted configuration. The seal module 30 is initially aligned with the branch axis and is advanced into the pipe 20 until the module is located in the pipe, as illustrated in FIG. 1. The hydraulic ram 32 is then actuated to translate and rotate the crank 34, which in turn rotates the seal module 30 via the clevis 38 through approximately 90 degrees to orientate the seal module towards the outboard end of the pipe 20. At the same time the launching stem bar assembly 37 is advanced to locate the padeye 41 within the pipe 20. The rotation mechanism provides accurate control over the location of the seal module 30 within the pipe 20 and prevents damage to the seal module 30 and/or the pipe 20.

The seal elements 42, 44 are initially retained in a radially retracted configuration by the anti-extrusion springs 52, 54. However, if hydraulic pressure is applied to the outboard portion of the cylinder 40c, the piston 46 is retracted into the first body portion 40, causing the second body portion 51 to compress the seal elements 42, 44. The seal elements 42, 44 expand radially to engage the pipe wall, as illustrated in FIGS. 3 and 4 of the drawings.

Once an initial seal has been formed between the pipe wall and the seal elements 42, 44, and pressure is bled off inboard of the seal module 30, the differential pressure across the module 30 urges the second body portion 51 to compress the seal elements 42, 44. It will be observed that the differential pressure acts over a relatively large area compared to the smaller cross-sectional area of the seal elements, such that the rubber pressure is maintained above the pressure differential, so preventing fluid bypass. This also prevents fluid pressure from migrating the seals, so preventing explosive decompression. Also, the relatively large diameter of the annular ring 58 ensures that the extrusion gap is minimal, such that there is no need to provide anti-extrusion mechanisms in the centre of the tool, facilitating the provision of compact seal elements.

Pressure forces acting on the seal module 30 are resisted by compressive contact between the clevis 38 and the padeye 41, the surfaces of the clevis and padeye being adapted to provide maximum surface contact on full articulation. The pressure load on the padeye 41 is supported by the launching stem bar assembly 37, and by the tee. Although the clevis pin 39 can support isolation loads, particularly for lower pressure applications, the configuration is such that more significant loads are transferred directly to the padeye 41.

The annular chamber 60 defined between the seal elements 42, 44, the annular ring 58 and the inner wall of the pipe 20 may be pressurised and then monitored to test the integrity of both seal elements. Once seal integrity has been tested, to a pressure which may be in excess of the differential pressure, operations may be carried out safely inboard of the module.

On completion of the operation, the seal elements 42, 44 are deactivated and the tool 10 may be removed from the pipe 20 via the hot tap connection 22.

In reference now to FIGS. 5 and 6 of the drawings, there is shown a cross sectional view of an isolation tool in accordance with another embodiment of the present invention. FIG. 6 is an enlarged cross sectional view of the tool of FIG. 5. It will be recognised that the embodiment of FIGS. 5 and 6 is similar to the embodiment of FIGS. 1 to 4 such that like components are indicated by like numerals incremented by 100.

As noted hereinabove, the position of the seal unit 130 in the pipe 120 is controlled by the location linkage, the location linkage comprising, in the illustrated embodiment, a clevis 138 and padeye 141. Thus, the tool 110 may be configured to locate the seal unit 130 within the pipe 120 to locate seal elements 142, 144 accurately at a position within range of a branch connection 122. This may be achieved by selecting or adjusting the geometry of the location linkage as appropriate.

In use, the tool 110 may be configured such that the seal elements 142, 144 will straddle a weld 66 (shown most clearly in FIG. 6) located between the connection 122 and the pipe 120. Once in position, the seal elements 142, 144 may be energised as described hereinabove in respect of the first embodiment. An annulus 160 between the seal elements 142, 144 may then be pressurised to pressure test the weld 66.

Thus, the tool 110 may be utilised as a joint, or weld test tool, for example, but not exclusively, for size on size tee fabrication. This may be achieved without the need to fluid fill and pressurise the rest of the pipe 120. This process may be repeated, the tool 110 being rotated by 180 degrees in order to test the opposite weld (not shown). Thus, the provision of a tool 110 according to this embodiment of the present invention permits the connection 122 to be welded in-line and each weld to be pressure tested without the need to install flanges for each connection point, with each connection requiring pressure testing.

It will be apparent to those of skill in the art that the above-described tool provides two bi-directional seal elements in a single unit, and thus provides for double block and bleed isolation of a pipe.

Alternatively, or in addition, the tool may be used to pressure test between the seal elements, for example, in order to pressure test a joint, weld or the like located between the seal elements.

Insertion of the tool and full pressure testing of both seal elements does not require the cutting or provision of any additional pipe openings or seals. The seal may be activated as desired, in the illustrated embodiment by means of hydraulic pressure, and once activated the module is configured such that differential pressure across the module will further energize the seal elements.

Those of skill in the art will further recognise that the illustrated apparatus is merely exemplary of the present invention, and that the same objectives may be achieved by using a variety of different configurations. The illustrated embodiment shows a welded hot tap tee, but the invention will of course have application with mechanical hot tap clamps. However, such clamps should be sufficiently robust to resist the axial loads that must be borne by the clamps. Also, the illustrated embodiment is shown in a full-bore hot tap. Other embodiments may be used on size-on-size tees.

The invention claimed is:

1. An isolation tool for use in isolating a section of a pipe, the isolation tool comprising:

a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the seal elements are adapted to be self-energising on the seal unit experiencing a predetermined differential pressure.

2. The isolation tool according to claim 1, wherein the isolation tool is adapted to be inserted into the pipe through a hot tap.

3. The isolation tool according to claim 1, wherein the isolation tool is adapted to be inserted into the pipe through an established opening.

4. The isolation tool according to claim 1, wherein at least one of the seal elements is capable of sealing the section of pipe.

5. The isolation tool according to claim 1, wherein at least one of the seal elements comprises a bi-directional seal.

6. The isolation tool according to claim 1, wherein at least one of the seal elements comprises an elastomeric seal.

7. The isolation tool according to claim 1, wherein at least one of the seal elements comprises a compression seal.

8. The isolation tool according to claim 7, wherein two seal elements comprise compression seals.

9. The isolation tool according to claim 1, wherein the seal elements are adapted to be compliant to the pipe surface.

10. The isolation tool according to claim 1, wherein the seal elements are adapted to be actuated at least in part mechanically.

11. The isolation tool according to claim 1, wherein the seal elements are adapted to be actuated at least in part hydraulically.

12. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the seal elements are adapted to be actuated, at least in part, by an externally applied actuation force.

13. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the seal elements are adapted to be actuated by a differential pressure across the seal unit.

14. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein a predominant proportion of the load generated on the seal unit by the pipe or a differential pressure established across the seal unit is transmitted through the seal unit to the seal elements.

15. The isolation tool according to claim 1, wherein the seal elements are annular.

16. The isolation tool according to claim 1, wherein the cross-sectional area of the seal elements is less than the pipe cross-sectional area and of the seal unit.

17. The isolation tool according to claim 1, wherein the seal elements are adapted to be initially compressed to provide at least initial isolation of the pipe.

18. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe; and
at least one anti-extrusion spring for each seal element.

19. The isolation tool according to claim 1, wherein the seal unit is adapted to be introduced into a pipe via a branch.

20. The isolation tool according to claim 19, wherein the seal unit is adapted to pass through the branch in alignment with the branch axis and then be rotated for alignment with the pipe axis.

21. The isolation tool according to claim 20, wherein the seal unit is adapted to be rotated through approximately 90 degrees.

22. The isolation tool according to claim 21, wherein seal unit rotation is adapted to be actuated at least in part hydraulically.

23. The isolation tool according to claim 21, wherein seal unit rotation is adapted to be actuated at least in part mechanically.

24. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the seal unit comprises a location linkage.

25. The isolation tool according to claim 24, wherein the location linkage comprises a clevis.

26. The isolation tool according to claim 24, wherein the location linkage further comprises a support member.

27. The isolation tool according to claim 26, wherein the support member comprises a padeye.

28. The isolation tool according to claim 24, wherein the location linkage is configured to locate the seal unit spaced from the pipe opening.

29. The isolation tool according to claim 24, wherein a dimension of the location linkage is selected to control the axial positioning of the seal unit within the pipe.

30. The isolation tool according to claim 24, wherein the length of the location linkage is selected to control the axial positioning of the seal unit within the pipe.

31. The isolation tool according to claim 26, wherein the location linkage is adapted to support loads applied by the seal unit to the support member.

32. The isolation tool according to claim 1, wherein the seal unit comprises a seal actuator.

33. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the seal unit comprises a seal actuator, and wherein the seal actuator includes a fluid piston adapted to be translated to provide compression of the seal elements.

34. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the seal unit comprises a seal actuator, and wherein axial compression of the seal elements deforms the elements radially outwards into contact with the circumferential wall of the pipe to provide a seal therebetween.

35. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the seal unit comprises a seal actuator, and wherein the seal actuator is adapted to be translated by application of a pressure differential across the actuator.

36. The isolation tool according to claim 35, wherein the pressure differential is induced, at least in part, by applying an elevated pressure outboard of the seal unit in the pipe.

37. The isolation tool according to claim 35, wherein the pressure differential is induced, at least in part, by venting fluid to create a lower pressure region inboard of the seal unit.

38. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the seal unit comprises an annular ring located around a central portion of the seal unit and between the seal elements.

39. The isolation tool according to claim 38, wherein in use, the seal unit is adapted to define an annular volume between the seal elements, the annular ring and the pipe.

40. The isolation tool according to claim 38, wherein the annular ring comprises a fluid conduit adapted for communication with the volume.

41. The isolation tool according to claim 40, wherein the fluid conduit comprises a bleed port adapted to permit fluid to be bled from the annular volume.

42. The isolation tool according to claim 39, wherein the seal integrity is adapted to be pressure tested by monitoring the pressure in the annular volume.

43. The isolation tool according to claim 1, wherein the tool is adapted to be removable from the pipe.

44. The isolation tool according to claim 1, wherein the seal elements are adapted to be deactivated by deactivating a seal actuator.

45. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the seal elements are adapted to be deactivated by application of pressure on the seal actuator.

46. An isolation tool for use in isolating a section of a pipe, the isolation tool comprising:
a seal unit adapted to be located in a section of pipe, the seal unit adapted to be inserted into the pipe via a single opening in the pipe wall and comprising at least two seal elements adapted to engage the pipe wall to block the pipe and isolate a section of pipe, wherein the tool is adapted to be removed from the pipe via a hot tap connection.

47. A method of isolating a section of a pipe, the method comprising the steps:
inserting a seal unit into the pipe through an opening in the wall of the pipe, the seal unit comprising at least two seal elements which are adapted to be self-energising on the seal unit experiencing a predetermined pressure; and
actuating the seal elements to block the pipe and isolate a section of the pipe.

48. The method of isolating a section of a pipe according to claim 47, wherein actuating the seal elements includes radially extending the elements from a retracted configuration.

49. A method of isolating a section of a pipe, the method comprising the steps:
inserting a seal unit into the pipe through an opening in the wall of the pipe, the seal unit comprising at least two seal elements;
actuating the seal elements to block the pipe and isolate a section of the pipe; and applying an elevated pressure to a volume between the seal elements to test the pressure integrity of both seal elements.

50. A method of isolating a section of a pipe, the method comprising the steps:
inserting a seal unit into the pipe through an opening in the wall of the pipe, the seal unit comprising at least two seal elements; and
actuating the seal elements to block the pipe and isolate a section of the pipe, wherein applying an elevated pressure to a volume between the seal elements permits a weld to be tested.

51. The method of isolating a section of a pipe according to claim 47, further comprising rotating the seal unit after insertion into the pipe to align the seal elements with a pipe axis.

52. The method of isolating a section of a pipe according to claim 47, further comprising forming an opening in a wall of a pipe.

* * * * *